United States Patent [19]
McKee

[11] 3,748,004
[45] July 24, 1973

[54] BALL BEARING WITH HOLLOW TRUNCATED SPHERICAL BALLS

[75] Inventor: Lewis W. McKee, Brookfield, Conn.

[73] Assignee: The Barden Corporation, Danbury, Conn.

[22] Filed: May 11, 1971

[21] Appl. No.: 142,152

[52] U.S. Cl. ............................................. 308/212
[51] Int. Cl. ........................................... F16c 33/30
[58] Field of Search ................... 308/212, 213, 195, 308/217, 288

[56] References Cited
FOREIGN PATENTS OR APPLICATIONS
163,322  8/1922  Great Britain ...................... 308/195
289,045  6/1928  Great Britain ...................... 308/195
604,023  4/1926  France .............................. 308/212

*Primary Examiner*—Charles J. Myhre
*Assistant Examiner*—Frank Susko
*Attorney*—Shenier & O'Connor

[57] ABSTRACT

A ball bearing comprising inner and outer rings having raceways therein and having a plurality of hollow truncated spherical balls each having the configuration of a major segment of a sphere in the raceways together with means for maintaining the outer spherical surfaces of the balls in contact with the raceways and to prevent contact between the raceways and the edges of the truncated portions of the balls.

6 Claims, 14 Drawing Figures

Patented July 24, 1973 3,748,004
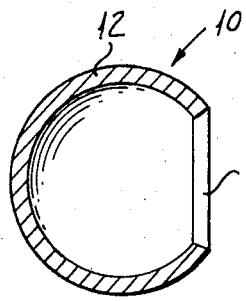
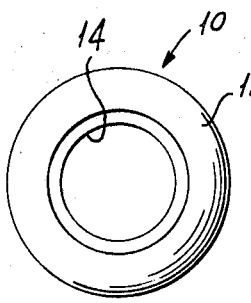
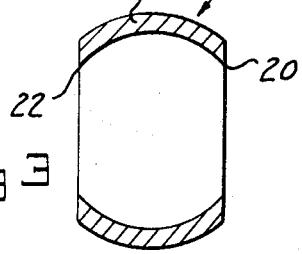
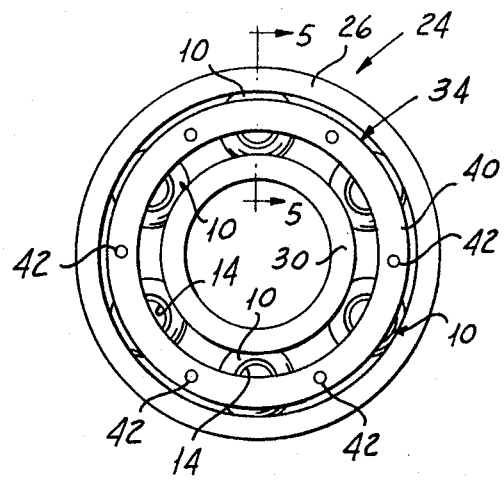
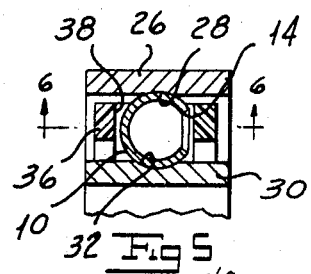
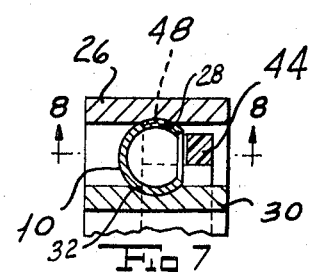
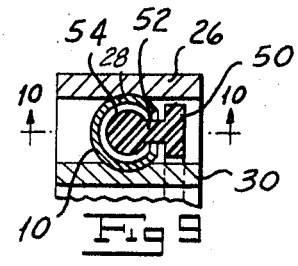
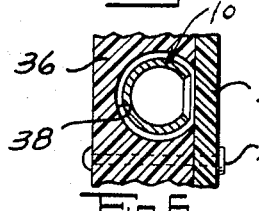
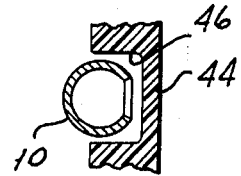
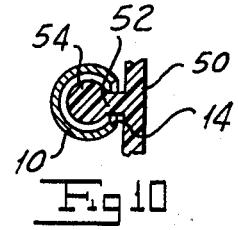
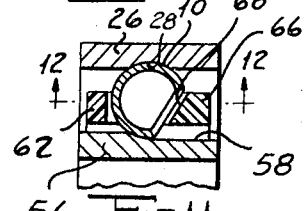
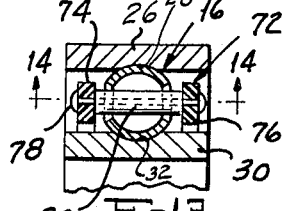
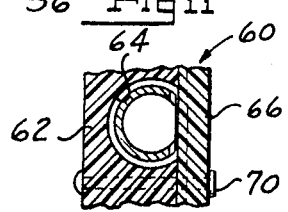
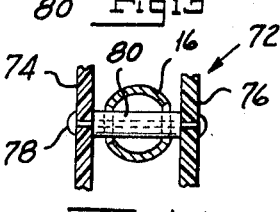
INVENTOR.
Lewis W. McKee
BY
Shenier & O'Connor
ATTORNEYS

BALL BEARING WITH HOLLOW TRUNCATED SPHERICAL BALLS

BACKGROUND OF THE INVENTION

Various forms of ball bearings such as deep groove bearings, angular contact bearings, and thrust bearings, are known in the prior art. In the vast majority of these bearings, solid spherical metal balls are disposed in raceways formed in inner and outer rings. While most of these bearings adequately serve the purposes for which they are designed, they embody a number of common limitations. First, they are relatively noisy, owing to pressure variations between the balls and the raceways. The life of ball bearings of the prior art is relatively limited owing to subsurface shear stress. The rotational speed of the bearing is limited owing to the centrifugal ball load. The bearings are relatively sensitive to thermal gradients owing to the fact that the ball expands and contracts.

I have invented a ball bearing which overcomes the defects of ball bearings of the prior art. My bearing is less noisy than are ball bearings of the prior art. It has a relatively longer life than do bearings of the prior art. My bearing is capable of higher speeds than are bearings of the prior art. My bearing is less sensitive to changes in temperature than are bearings of the prior art.

SUMMARY OF THE INVENTION

One object of my invention is to provide an improved ball bearing which is less noisy than are bearings of the prior art.

Another object of my invention is to provide an improved ball bearing which has a longer life than do bearings of the prior art.

A further object of my invention is to provide an improved ball bearing which is self-lubricated.

Still another object of my invention is to provide an improved ball bearing which is capable of higher speeds than are ball bearings of the prior art.

A still further object of my invention is to provide a ball bearing which is less sensitive to thermal gradients than are bearings of the prior art.

Other and further objects of my invention will appear in the following description.

In general my invention contemplates the provision of a ball bearing in which I form the balls as hollow truncated spheres and locate the balls in raceways formed in inner and outer rings. I provide my bearing with means for maintaining the outer spherical surfaces of the balls in contact with the raceways and for preventing contact between surfaces of the truncated portion and the raceways.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a sectional view of one form of ball which I employ in my improved ball bearing.

FIG. 2 is an end elevation of the form of ball shown in FIG. 1.

FIG. 3 is a sectional view of an alternate form of ball which I employ in my improved ball bearing.

FIG. 4 is an end elevation of my improved ball bearing having truncated hollow spherical balls.

FIG. 5 is a fragmentary sectional view of the form of bearing illustrated in FIG. 4 taken along the line 5—5 of FIG. 4.

FIG. 6 is a fragmentary sectional view of the form of my ball bearing illustrated in FIG. 5 with the outer ring removed taken along the line 6—6 of FIG. 5.

FIG. 7 is a fragmentary sectional view of my improved ball bearing illustrating an alternate form of ball positioning element.

FIG. 8 is a fragmentary sectional view of the ball bearing illustrated in FIG. 7 with the outer ring removed taken along the line 8—8 of FIG. 7.

FIG. 9 is a fragmentary sectional view of my improved ball bearing illustrating another form of ball positioning element.

FIG. 10 is a sectional view of the ball bearing illustrated in FIG. 9 with the outer ring removed and taken along the line 10—10 of FIG. 9.

FIG. 11 is a fragmentary sectional view of an alternate form of my improved ball bearing.

FIG. 12 is a sectional view of the form of my ball bearing shown in FIG. 11 with the outer ring removed and taken along the line 12—12 of FIG. 11.

FIG. 13 is a fragmentary sectional view of still another form of my improved ball bearing.

FIG. 14 is a sectional view of the form of my bearing shown in FIG. 13 with the outer ring removed and taken along the line 14—14 of FIG. 13.

DESCRIPTION OF THE PREFERRED EMBODIMENT

Referring now to FIGS. 1 and 2 of the drawings I have illustrated one form of ball indicated generally by the reference character 10 which I may use in my improved ball bearing. The ball 10 includes a hollow spherical body 12 of metal such as steel which is formed, heat treated, ground and lapped by methods well known to the art. Either in the course of formation of the body 12 or after a complete spherical body has been formed I provide the body 12 with an opening 14 leading into the center of the body 12 so that the ball 10 has a hollow truncated spherical configuration which may be described as a major spherical segment. Owing to the manner in which I form the ball the grain of the metal is parallel to the ball surface.

Referring to FIG. 3 I have illustrated another form of ball indicated generally by the reference character 16 which I may incorporate in my improved bearing. The ball 16 comprises a body 18 which is truncated along edges 20 and 22. As in the case of the ball 10, ball 16 may be termed a major spherical segment having two equal bases. As will be explained more fully hereinafter I may employ either the form of ball shown in FIGS. 1 and 2 or the form of ball shown in FIG. 3 to make up my bearing.

Referring now to FIGS. 4 and 6 one form of my improved ball bearing indicated generally by the reference character 24 includes an outer ring 26 provided with a raceway 28 and an inner ring 30 provided with a raceway 32. I dispose a plurality of balls such as balls 10 in the raceways 28 and 32 between rings 26 and 30. It will readily be appreciated that in order for the bearing 24 to function effectively the outer spherical surfaces of balls 10 must be maintained in contact with raceways 28 and 32 and contact between the edge 14 and the raceways must be prevented. One form of retainer indicated generally by the reference character 34 which I employ to achieve this purpose comprises an annular body 36 of suitable material formed with a plurality of ball-receiving openings 38. It will be seen that all of the ball-receiving openings 38 are open at one edge of the annular body 36. I secure a ring 40 of retainer-forming material to the edge of the body 36 by any suitable means such as by rivets or the like 42 so that the ring 40 closes the openings 38 to form pockets which are generally circular but which have a flat surface along a chord of the circle formed by the inner surface of the ring 40. The balls 10 are placed in the pockets so that the truncated edge faces the inner surface of the ring 40. Thus when the balls and the retainer element 34 are assembled in position in bearing 24 the outer spherical surfaces of the balls 10 contact the raceways and the inner surface of ring 40 cooperates with the edge of the truncated portion of the balls 12 to maintain them in that position and prevent any contact between the edge of the truncated portion and the raceways.

Referring to FIGS. 7 and 8 an alternate form of retainer 44 is generally annular shape and is provided with pockets 46 each of which has a flat surface cooperating with the edge of the ball segment to maintain the spherical outer surface of the ball in contact with the raceway. This retainer 44 is of the type which is provided with radially outwardly extending bosses 48 between the balls which snap into the outer raceway 28 so as to maintain the separator 44 in position.

Referring to FIGS. 9 and 10 yet another form of separator 50 which I may employ to maintain contact between the spherical outer surface of the balls 10 and the raceways 28 and 32 includes an annular body 50 provided with axially extending arms 52 carrying generally spherical knobs 54 which can be snapped into place inside the balls 10. This type of separator 50 is retained in position in the assembly by virtue of the engagement of the knobs 54 with the balls and by virtue of the engagement of the balls in the raceways.

Referring now to FIGS. 11 and 12 I have shown an angular contact form of bearing assembly in which the outer ring 26 is the same as is the ring 26 of bearing 24 but in which the inner ring 56 has a raceway 58 one shoulder of which is cut away. In this form of bearing the balls 10 are maintained with the plane of the truncated portion at an acute angle to the axis of the bearing properly to maintain the spherical areas of the bearing in contact with the raceways. To achieve this result I employ a retainer assembly comprising an annular body 62 formed with ball-receiving openings 64 and provided with an edge at one end which is inclined at an acute angle to the axis of the bearing and into which the openings 64 extend. A ring 66 having an edge 68 which mates with the angularly inclined edge of body 62 is secured to the body 62 by rivets 70 or the like so as to close the opening 64 to form ball pockets. These pockets have a flat edge portion which is inclined at an acute angle to the axis of the bearing so as to maintain the balls 10 in the positions illustrated in FIG. 11.

Referring now to FIGS. 13 and 14 I have illustrated a form of bearing which includes the balls 16. this form of bearing in order to maintain the balls 16 properly oriented with their spherical surfaces in engagement with raceways 28 and 32 I pass hollow rods 80 through the respective balls. Rods 80 extend between annular rings 74 and 76 and are secured therebetween by any suitable means such as by rivets 78 to form the retainer assembly 72.

In operation of all forms of my bearing assembly the balls roll on the raceways in the manner of bearings of the prior art. The particular separator or retainer structure of all forms of my bearing ensures that the spherical outer surfaces of the balls 10 or 16 are maintained in contact with the raceways and the truncated edges are not permitted to engage the raceways. Owing to the fact that the balls 10 or 16 are flexible, pressure variations ball to race can be accommodated and the bearing operates with less noise than do bearings of the prior art.

In forming the balls of my bearing the direction of grain of the metal is parallel to the spherical surface so that subsurface shear stress is reduced as compared with solid balls and my bearing has a longer life than do solid ball bearings of the prior art. Since the ball weight is reduced centrifugal ball load is reduced and my bearing can operate at a higher speed than a similar bearing incorporating solid balls. The hollow interior of my ball can accommodate a supply of lubricant such as grease. Since the balls are resilient they can flex in response to thermal gradients and therefore are less sensitive to temperature changes than are bearings of the prior art.

It will be seen that I have achieved the objects of my invention. I have provided a ball bearing which generates less noise and which has a longer life than do bearings of the prior art incorporating solid balls. My bearing can operate at higher speeds and is less sensitive to thermal gradients.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A ball bearing including in combination an outer ring having a raceway therein, an inner ring having a raceway therein, a plurality of hollow resilient rolling elements of frusto-spherical shape, each of said rolling elements having the configuration of a major spherical segment having a single base, said elements disposed between said rings in said raceways, and means cooperating with said bases for preventing said bases from registering with said raceways to maintain spherical portions of said elements in engagement with said raceways.

2. A ball bearing as in claim 1 in which said means cooperating with said bases comprises a retainer having a plane surface disposed in closely spaced relationship to said bases.

3. A ball bearing as in claim 2 in which said retainer plane surface is generally perpendicular to the axis of rotation of said bearing.

4. A ball bearing as in claim 2 in which one of said raceways is an angular contact raceway whereby said bases are relatively angularly disposed with respect to the axis of rotation of said bearing.

5. A ball bearing as in claim 1 in which said rolling elements are formed with openings in said bases and in which said means cooperating with said bases comprises a retainer having portions extending into said elements through said openings.

6. A ball bearing as in claim 5 in which said portions comprise knobs adapted to snap into said elements through said openings.

* * * * *